United States Patent [19]
Eckstein

[11] 3,908,649

[45] Sept. 30, 1975

[54] PERSONAL FILTER RESPIRATOR

[75] Inventor: Wolfgang Eckstein, Sereetz, Germany

[73] Assignee: Dragerwerk AG, Germany

[22] Filed: Dec. 3, 1973

[21] Appl. No.: 420,893

[30] Foreign Application Priority Data
Dec. 22, 1972 Germany.............................. 2262902

[52] U.S. Cl................................. 128/147; 128/212
[51] Int. Cl.² .......................................... A61B 7/00
[58] Field of Search............ 128/140 R, 141 R, 142, 128/142.6, 146.3, 146.4, 146.5, 146.6, 147, 201, 207, 210, 212, 254–255; 165/110; 252/62; 260/31.2 R

[56] References Cited
UNITED STATES PATENTS

| | | | |
|---|---|---|---|
| 3,104,196 | 9/1963 | Shannon | 252/62 |
| 3,464,410 | 9/1969 | Buchanan | 128/212 |
| 3,726,755 | 4/1973 | Shannan | 252/62 |

FOREIGN PATENTS OR APPLICATIONS

| | | | |
|---|---|---|---|
| 1,115,349 | 1968 | United Kingdom | 128/212 |

Primary Examiner—Richard A. Gaudet
Assistant Examiner—Rick Opitz
Attorney, Agent, or Firm—McGlew and Tuttle

[57] ABSTRACT

A filter respirator which is particularly useful for self protection against carbon monoxide comprises a filter casing which is filled with a catalyst material. A mouthpiece assembly includes a shoulder portion which is engaged on the filter casing for connecting the casing for flow from the opposite end through the casing and through the shoulder to an internal chamber of the mouthpiece which comprises a heat exchanger which is advantageously filled with a material of low thermal conductivity such as wire, chips, mesh, grains, pellets, pipe cuttings or similar material. The air which is inhaled is directed through the filter casing and the heat exchanger chamber of the mouthpiece to the mouthpiece and in so doing it is evaporated on the surface of the filling material before it enters a person's respiratory system and is then discharged backwardly through the mouthpiece through an outlet valve.

2 Claims, 1 Drawing Figure

U.S. Patent  Sept. 30,1975  3,908,649
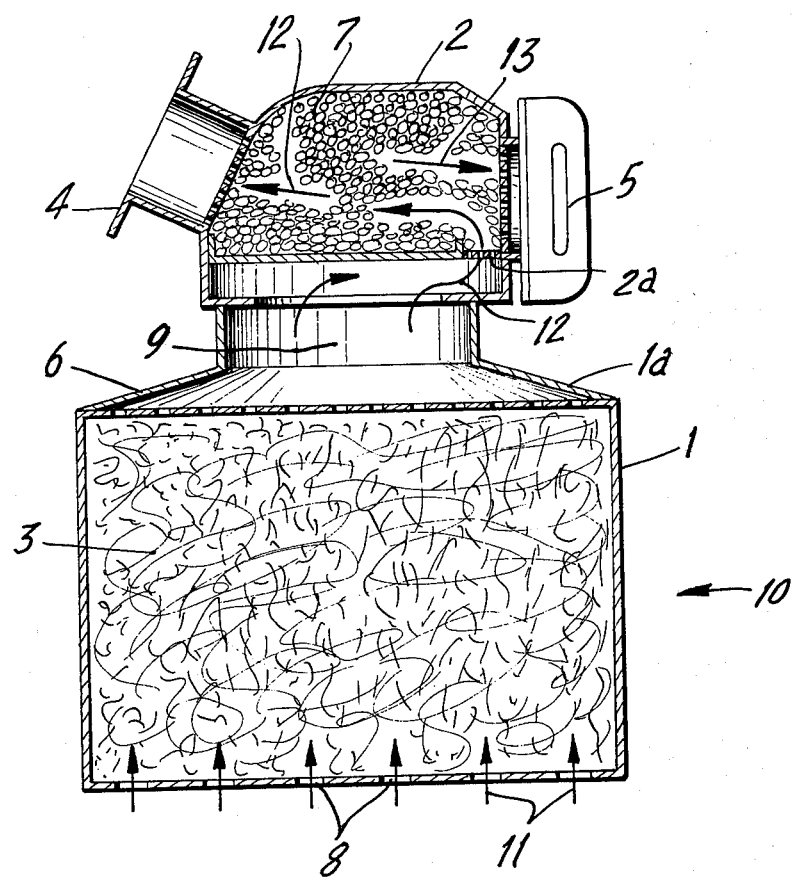

3,908,649

PERSONAL FILTER RESPIRATOR

BACKGROUND OF THE INVENTION

1. Field of the Invention

This invention relates in general to the construction of respirators and in particular to a new and useful personal filter respirator for self protection against carbon monoxide and which includes a filter casing filled with a catalyst and a mouthpiece casing which is connected to the filter casing for inhalation of air flowing through the filter casing and which is filled with a material of low thermal conductivity such as wire, chips, grains, pellets, or the like.

2. Description of the Prior Art

A filter device for self protection is known wherein the inhaled air is conducted through a chamber in which it is cooled and which has an outer wall provided with cooling ribs. The inhaled air is thus cooled by the ambient air. However this takes places only when a cooling air stream is in contact with the ribs so that a good heat exchange may take place. Another known filter device for self protection includes cooling means in the form of a heat exchanger having metal wires, shavings, mesh or the like arranged in the air flow passage so that it is alternately contacted by the inhaled and the exhaled air. In this latter device the air flows past the heat radiating parts or particles of the heat exchanger in both directions of flow. Because of the moisture which is contained in the exhaled air this device is able to eliminate heat in a satisfactory manner.

SUMMARY OF THE INVENTION

The present invention provides an improved personal filter respirator having a heat exchanger arrangement which is vastly improved from the known construction and which provides an improved arrangement for the cooling of the inhaled air. The invention includes a construction wherein the housing of the mouthpiece is provided with a material having a low thermal conductivity which may for example be a plastic material, glass, non-porous ceramic materials or similar materials used in the form of wires, chips, mesh, grains, pellets, pipe cuttings or similar form. Surprisingly in using such a material a considerably improved cooling of the inhaled air is obtained. This is due to the fact that the substance used accumulates less heat in their interior than the well heat of conducting metals. The result seems to be that the surface temperature of these materials is relatively low. Besides, with the exhalation flow saliva from the user's mouth and thereby water comes into contact with the material and is evaporated. Consequently, a great amount of heat is absorbed which is withdrawn from the ambience primarily from the inhaled air. The cooling is thus more effective.

Thus the invention provides a heat exchanger in the form of a material of low heat conductivity which is arranged in a mass so that there is a flow passage therethrough and acts to provide a cooling effect on the air flowing therethrough. The heat exchanger in accordance with the invention can be used not only in a filter respirator for self protection but also in all breathing apparatus where the inhaled air has a high temperature which is excessive or is injurious to health.

Accordingly it is an object of the invention to provide an improved filter respirator particularly for protection against carbon monoxide which comprises a filter casing filled with a catalyst and a mouthpiece casing containing a heat exchanger which comprises a material of low thermal conductivity in the form of a mass such as wires, chips, mesh, grains, pellets, pipe cuttings or the like.

A further object of the invention is to provide a filter respirator which includes a filter casing having a catalyst material therein with a flow passage inlet at one end connected to an inlet passage of a mouth casing secured to the opposite end of the filter casing. The mouth casing includes a mouthpiece arranged to inhale air through the filter casing and the material therein and through the mouthpiece casing and the material therein and for subsequently directing the air outwardly through only the material in the mouthpiece casing to an outlet valve.

A further object of the invention is to provide a filter respirator which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWINGS

In the Drawing:

The only FIGURE of the drawing is a transverse sectional view of a filter respirator for self protection against carbon monoxide constructed in accordance with the invention.

GENERAL DESCRIPTION OF THE PREFERRED EMBODIMENT

Referring to the drawing in particular, the invention embodied therein comprises a filter respirator generally designated 10 which comprises a filter casing 1 and a mouthpiece casing 2 which is joined to a connecting end 1a of the filter casing 1 by a shoulder piece 6.

In accordance with a feature of the invention the mouthpiece casing 2 is provided with a mouthpiece fitting 4 at one end and an exhaling valve 5 at the opposite end. It is also connected through a connecting passage 2a to a passage 9 in the shoulder piece 6 which connects to the connecting end 1a of the filter casing 1. The opposite end of the filter casing 1 is provided with inlet openings 8 for the flow of inlet air as indicated by the arrows 11. The mouthpiece casing 2 is permanently or detachably connected to the shoulder part 6 and it is hermetically sealed toward the outside.

In accordance with a further feature of the invention the mouthpiece casing 2 is formed as a heat exchanger and it is filled with material 7 having a low thermal conductivity. This material of low thermal conductivity may be in a form such as: wire, chip, mesh, grain, pellet, pipe cutting...or similar form.

During the inhalation phase of operation the intake air enters in the direction of the arrows 11 through the inlet openings 8 and flows through the filter casing 1 and through the catalyst material 3 and it leaves the filter casing 1 through the passage 9 and passes through the inlet 2a of the mouthpiece casing 2. The air then flows over the filling material 7 and into the mouth of the user. During this period the exhaling valve 5 is closed. When the air is exhaled and directed in the direction of arrows 13 it passes over the filling material 7 and then through the exhaling valve 5 into the ambient air. The inhaled air flows in the direction of the arrows 12 and the moisture on the surface of the filling material 7 is evaporated into the air. Heat is thereby withdrawn from the inhaled air before it enters into the person's mouth and is cooled. The portion of the exhaled air which passes through the filter casing 1 is negligible because of the higher resistance to flow in the direction backwardly through the inlet opening 2a.

While a specific embodiment of the invention has been shown and described in detail to illustrate the application of the principles of the invention, it will be understood that the invention may be embodied otherwise without departing from such principles.

What is claimed is:

1. A filter respirator for self-protection against carbon monoxide and which has a catalyst portion which operates at high temperatures and a mouthpiece casing portion which is operable to cool respirated air by the evaporation of the user's saliva, comprising a catalyst casing having an air inlet and an internal passage filled with a catalyst material, and a mouthpiece casing connected to said catalyst casing with passage means for a flow of air from the catalyst casing through said mouthpiece casing, said mouthpiece portion casing containing an internal heat exchanger chamber filled with a plastic material of low thermal conductivity through which the inhaled air is passed so that the saliva adheres to the material and the subsequent inhaled air is cooled by the evaporation of the saliva.

2. A filter respirator for self-protection against carbon monoxide and which has a catalyst portion which operates at high temperatures and a mouthpiece casing portion which is operable to cool respirated air by the evaporation of the user's saliva, comprising a catalyst casing having an air inlet and an internal passage filled with a catalyst material, and a mouthpiece casing connected to said catalyst casing with passage means for a flow of air from the catalyst casing through said mouthpiece casing, said mouthpiece portion casing containing an internal heat exchanger chamber filled with a glass material of low thermal conductivity through which the inhaled air is passed so that the saliva adheres to the material and the subsequent inhaled air is cooled by the evaporation of the saliva.

* * * * *